(12) United States Patent
Miyamoto et al.

(10) Patent No.: US 7,775,580 B2
(45) Date of Patent: Aug. 17, 2010

(54) DOOR GLASS GUIDING STRUCTURE FOR VEHICLE

(75) Inventors: Tomomi Miyamoto, Fuchu-cho (JP);
Norifumi Inoue, Fuchu-cho (JP);
Yukihiro Moriyama, Fuchu-cho (JP);
Yoshihiro Kinoshita, Hiroshima (JP);
Tooru Waki, Hiroshima (JP); Kazuhiro Takagaki, Ibara (JP); Akio Okayama, Hiroshima (JP)

(73) Assignees: Mazda Motor Corporation (JP);
Ishizaki Honten Co., Ltd. (JP);
Katayama Kogyo Co., Ltd. (JP);
Nishikawa Rubber Co., Ltd. (JP)

( * ) Notice: Subject to any disclaimer, the term of this patent is extended or adjusted under 35 U.S.C. 154(b) by 171 days.

(21) Appl. No.: 11/884,893

(22) PCT Filed: Feb. 24, 2006

(86) PCT No.: PCT/JP2006/303471
§ 371 (c)(1),
(2), (4) Date: Feb. 13, 2008

(87) PCT Pub. No.: WO2006/090851
PCT Pub. Date: Aug. 31, 2006

(65) Prior Publication Data
US 2008/0252097 A1    Oct. 16, 2008

(30) Foreign Application Priority Data
Feb. 25, 2005  (JP) .............................. 2005-050897

(51) Int. Cl.
B62D 25/04  (2006.01)
B60J 5/04  (2006.01)

(52) U.S. Cl. ....................................... 296/146.2; 49/502

(58) Field of Classification Search .................. 49/502, 49/440, 441; 296/146.1, 146.2
See application file for complete search history.

(56) References Cited

U.S. PATENT DOCUMENTS

| 5,139,307 | A | 8/1992 | Koops |
| 5,404,677 | A | 4/1995 | Umeda |
| 6,422,639 | B1 | 7/2002 | Hemauer |

FOREIGN PATENT DOCUMENTS

DE    3029765 A1    3/1982

(Continued)

OTHER PUBLICATIONS

European Search Report dated Jul. 16, 2009; Application No./Patent No. 06714610.0-2423 / 1852292 PCT/JP2006303471.
Zhang Bingyang, "Chinese Office Action", Jan. 6, 2009, Application No. 2006800059371.

*Primary Examiner*—Glenn Dayoan
*Assistant Examiner*—Melissa A Black
(74) *Attorney, Agent, or Firm*—Studebaker & Brackett PC; Donald R. Studebaker

(57) ABSTRACT

A door glass guiding structure is provided which can be constituted by using a glass guide member made from a low-priced material such as rolled sheet, and is capable of satisfactorily maintaining required functions.

The door glass guiding structure 3 comprises the glass guide member 10 which is disposed between two door glasses supported side by side on a door for example, the side door 2) of the vehicle so as to guide the vertical movement of at least one of the door glasses, the core bracket 21 which is constituted of a member different from the glass guide member 10 and is mounted on top end of the glass guide member 10 so as to extend the length thereof upward, and the guide upper end seal member 13 attached to cover the external surface of the core bracket 21 so as to provide water-tight sealing on the top ends of the two door glasses.

15 Claims, 16 Drawing Sheets

FOREIGN PATENT DOCUMENTS

| | | |
|---|---|---|
| DE | 199 06 927 A1 | 8/2000 |
| DE | 19906927 A1 | 8/2000 |
| FR | 2858950 A | 2/2005 |
| JP | 61218423 A * | 9/1986 |
| JP | 64-039125 | 3/1989 |
| JP | 05-068721 | 9/1993 |
| JP | 07-108831 | 4/1995 |
| JP | 07108831 A | 4/1995 |

* cited by examiner

DOOR GLASS GUIDING STRUCTURE FOR VEHICLE

TECHNICAL FIELD

The present invention relates a door glass guiding structure for vehicle, and more particularly to a door glass guiding structure disposed between two door glasses supported side by side on a door of a vehicle.

BACKGROUND ART

In a vehicle having side doors of the so-called sashless type, a so-called front ventilator glass fixed and supported on the front end of the side door and a movable door glass supported vertically movably behind the front ventilator glass, it has been in practice to install a glass guide member, that supports the front ventilator glass on the rear edge thereof and guides the vertical movement of the movable door glass, between the two door glasses (the front ventilator glass and the movable door glass), as described in the below mentioned Patent Publication 1.

With the door glass guiding structure disclosed in the Patent Publication 1 mentioned below, the glass guide member is also provided on the top end thereof with a guide upper end seal member which is secured through male-female fitting therewith, so as to seal the top ends of the front ventilator glass and the movable door glass by means of the guide upper end seal member. In the door glass guiding structure of this type, however, the guide upper end seal member is subjected to a lateral load and/or a downward load applied by a front pillar that is installed in contact with the guide upper end seal member or similar load applied via the movable door glass by a foldable roof made of canvas or the like, making the mounting of the guide upper end seal member unstable depending on the load exerted by the components of the vehicle body such as the front pillar and the roof, thus giving rise to the possibility of the sealing function being lost. Therefore, in the door glass guiding structure of this type, it is necessary to form the top end of the glass guide member in such a shape that is appropriate for attaching the guide upper end seal member, so that the guide upper end seal member which receives the load described above can be firmly supported.

Vehicle having the door glass guiding structure disclosed in the Patent Publication 1 mentioned below has recently been put on the market. However, the vehicle has a problem of high manufacturing cost because the glass guide member is made by cutting a blank material which makes the member relatively expensive, in order to satisfy the requirements including one related to the shape of the glass guide member at the top end. Such an expensive member made by cutting a blank material may be employed in vehicles in relatively high price range, but not in vehicles manufactured with emphasis on competitive pricing. There has been a demand for a low-cost door glass guiding structure which can be employed in such competitively priced vehicles.

The present invention has been devised to meet the demand described above, and an object thereof is to provide a door glass guiding structure that comprises a glass guide member which can be made from a low-priced material such as rolled sheet, and is capable of satisfactorily maintaining required functions without being affected by loads exerted by surrounding members of the vehicle body.

Patent Publication 1: DE1990 6927

DISCLOSURE OF THE INVENTION

The problem described above is solved by a door glass guiding structure of the present invention comprising a glass guide member disposed between two door glasses supported side by side on a door of a vehicle so as to guide the vertical movement of at least one of the door glasses, a core bracket which is constituted as a member different from the glass guide member and is mounted on top end of the glass guide member so as to extend the length thereof upward, and a guide upper end seal member attached to cover the external surface of the core bracket so as to provide water-tight seal on the top ends of the two door glasses.

BEST MODE FOR CARRYING OUT THE INVENTION

Preferred embodiments of the present invention will now be described with reference to the accompanying drawings.

Figure 1:
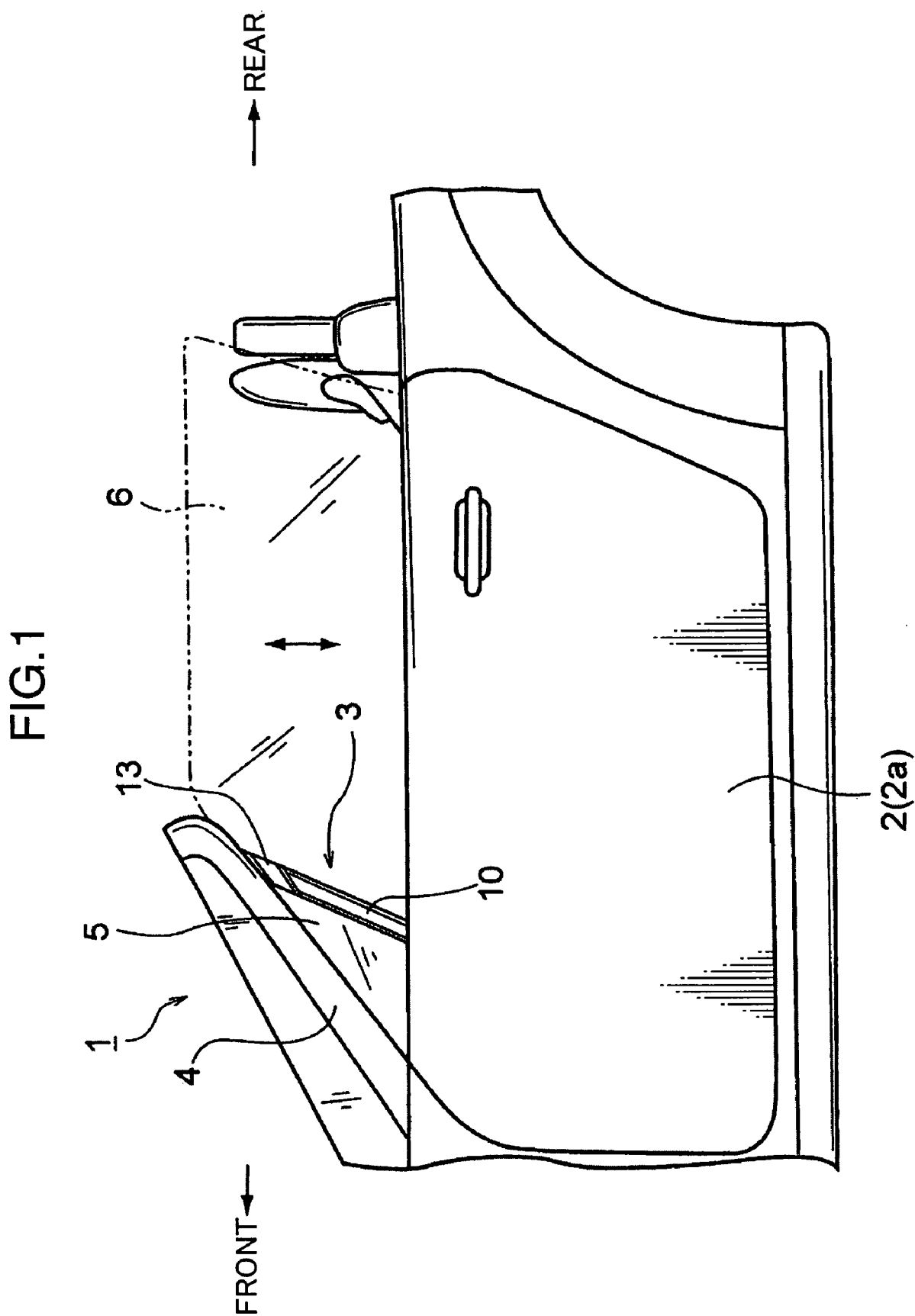
FIG. 1 is a side view of a 2-seater open car employing a door glass guiding structure according to a first embodiment of the present invention.

FIG. 1 shows a vehicle which employs the door glass guiding structure according to the first embodiment of the present invention. The vehicle 1 shown in FIG. 1 is a 2-seater open car, which can be converted into a roofed automobile by unfolding a foldable roof made of canvas or steel housed in the rear of the vehicle 1.

The door glass guiding structure 3 of this embodiment is used in side doors 2 located on the right and left sides of the vehicle 1. The door glass guiding structure 3 and the technical details thereof will now be described.

The side door 2 has a door body 2a, with a so-called front ventilator glass 5 having a relatively small area disposed adjacent to the front pillar 4 and a door glass 6 having a relatively large area disposed behind the front ventilator glass 5, which are supported on the door body 2a. The door glass 6 is supported so as to be capable of moving vertically by a drive mechanism which is installed inside of the door body 2a and is not shown in the drawing, as in the prior art, in such a constitution that the top edge of the door glass 6 makes close contact with a roof sealing member attached to the roof member made of canvas, steel or the like when the door glass 6 is lifted to the uppermost position. The door glass 6 can be moved up and down in this way, and will therefore be referred to as movable door glass 6.

The door glass guiding structure 3 includes a long glass guide member 10 installed in the door body 2a of the side door 2 so as to protrude upward therefrom. The glass guide member 10 and the front ventilator glass 5 are secured onto the door body 2a via a bracket 11 shown in FIG. 2. Reference numeral 12 in FIG. 2 shows a so-called belt line (a line that divides the upper portion and lower portion of the vehicle body at the top end of the side door 2).

The door glass guiding structure 3 has the guide upper end seal member 13 fitted to the top end of the glass guide member 10, so as to water-tight seal on the top ends of the front ventilator glass 5 and the movable door glass 6 by means of the guide upper end seal member 13 as in the prior art. The guide upper end seal member 13 is molded from an elastic plastic material. As will be seen from FIG. 1, both the front ventilator glass 5 and the movable door glass 6 have sashless construction, such that closing the side door 2 brings the front edge of the front ventilator glass 5 and the top end of the guide upper end seal member 13 into close contact with a body-side sealing member (not shown) provided on the front pillar 4, and brings the top end of the movable door glass 6 into close contact with the roof-side sealing member of the roof made of canvas or steel sheet.

Figure 2:
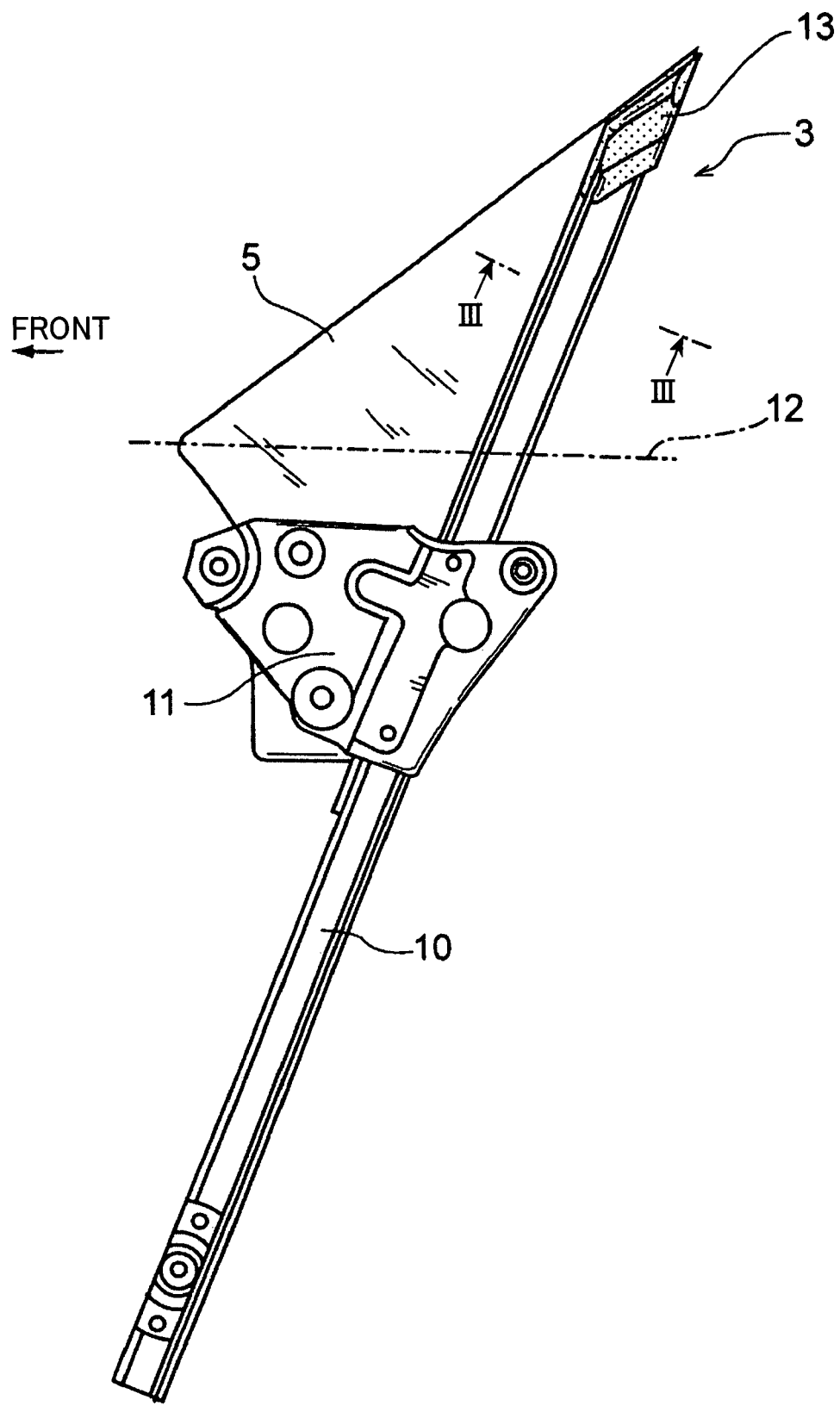
FIG. 2 shows the door glass guiding structure extracted from the 2-seater open car of FIG. 1.
Figure 3:
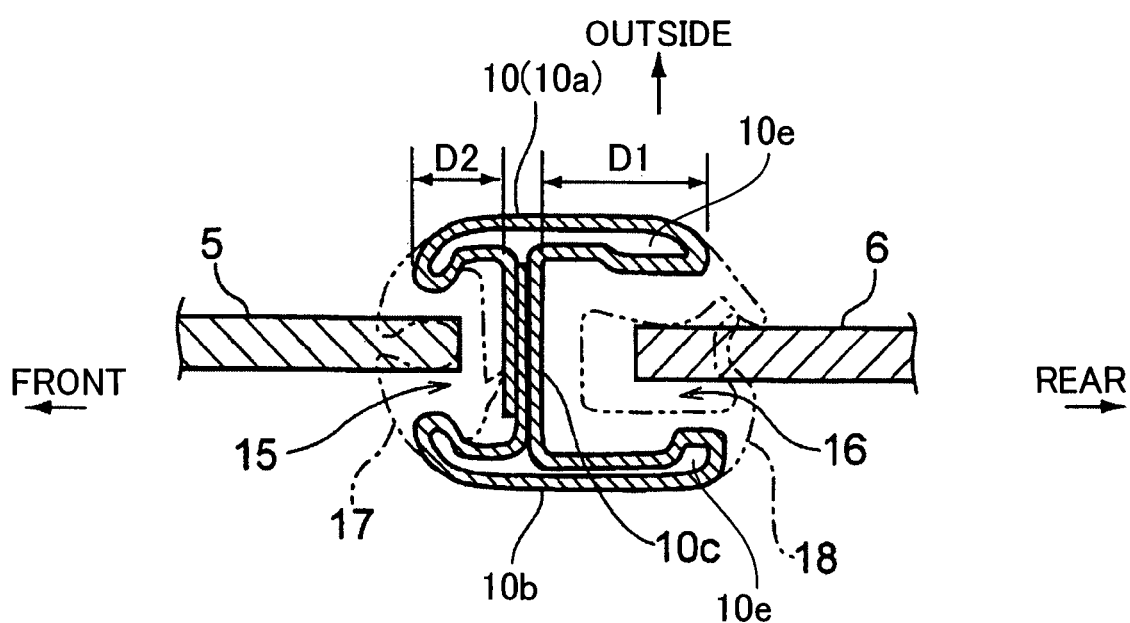
FIG. 3 is a sectional view taken along lines III-III of FIG. 2.
Figure 4:
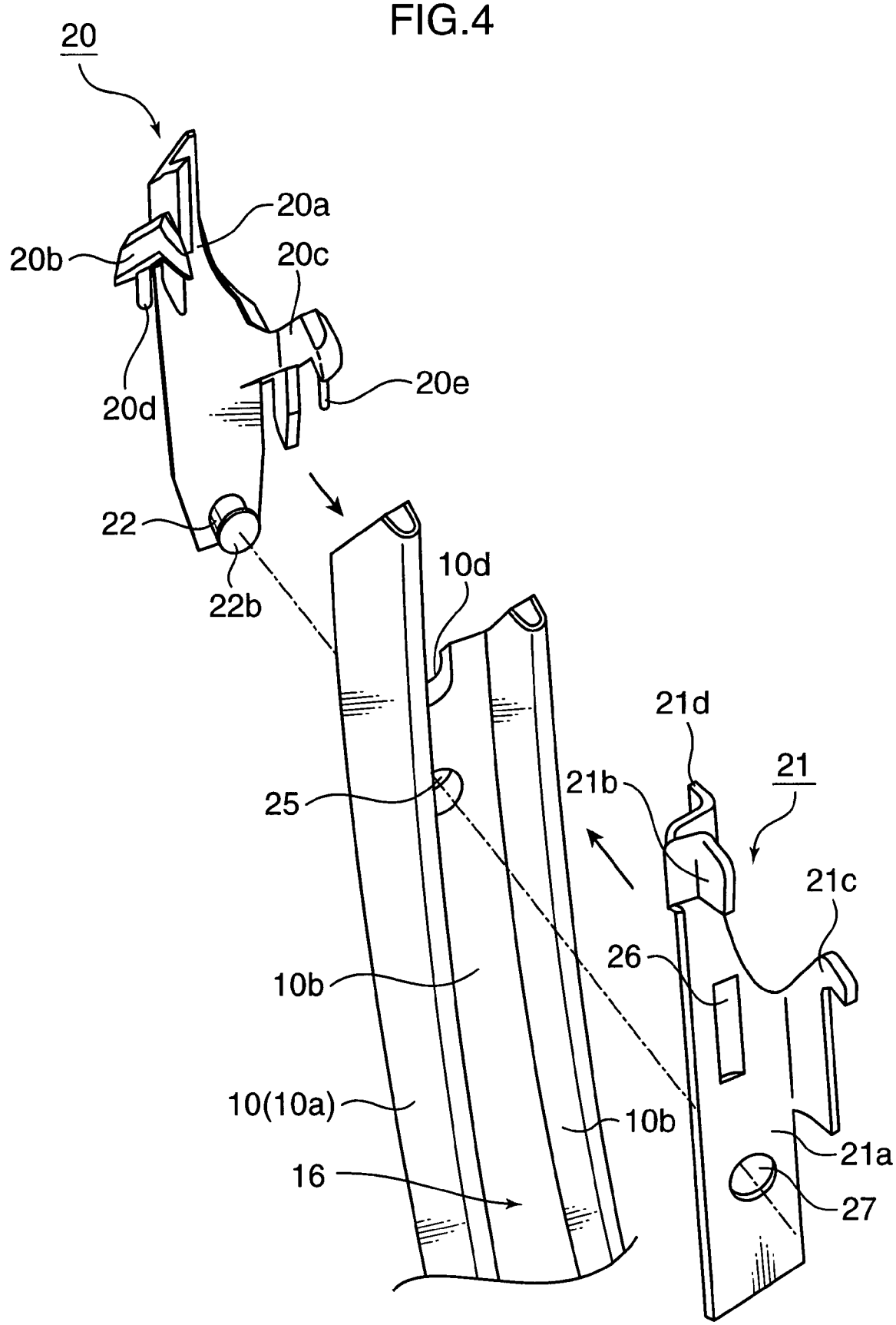
FIG. 4 is an exploded perspective view showing the glass guide member, a guide extension member and a core bracket that constitute the door glass guiding structure.

FIG. 3 is a sectional view taken along lines III-III of FIG. 2. As shown in FIG. 3, the glass guide member 10 is made by rolling a sheet with substantially H-shaped cross section, and has a pair of flanges 10a, 10b and a web 10c that connects the flanges 10a, 10b at the middle thereof. The glass guide member 10 has front and rear channels 15, 16 delimited by the portions 10a through 10c on the front and rear sides. The front and rear channels 15, 16 are disposed back to back so as to open in the opposite directions (front and back), and extend in the longitudinal direction of the glass guide member 10 (vertical direction). As shown in FIG. 4, the glass guide member 10 also has a notch 10d formed by cutting into the top edge of the web 10c, so that a bulging portion 26 of the core bracket 21 to be described later engages with the notch 10d.

The glass guide member 10 has H-shaped cross section of which front and rear portions are asymmetrical. When the front channel 15 and the rear channel 16 are compared, depth D1 of the rear channel 16 is made larger than depth D2 the front channel 15, as will be clearly seen in FIG. 3. By forming the rear channel 16 with a groove deeper than that of the front channel 15, sufficient rigidity of support for the movable door glass 6 is ensured as the front edge of the movable door glass 6 that has a relatively large area is inserted into the deeper rear channel 16. Fitted in the front and rear channels 15, 16 are front and rear weather strips 17, 18, respectively, so that water-tight sealing is provided between the rear edge of the front ventilator glass 5 and the front edge of the movable door glass 6 by the front and rear weather strips 17, 18.

The door glass guiding structure 3 has a guide extension member 20 and the core bracket 21 which are disposed on the top end of the glass guide member 10 as shown in FIG. 4, the external surfaces of the members 20, 21 being covered by the guide upper end seal member 13 described previously. The guide extension member 20 is disposed on the front channel 15 side of the glass guide member 10. On the other hand, the core bracket 21 is disposed on the rear channel 16 side of the glass guide member 10. In other words, the guide extension member 20 and the core bracket 21 are attached to the glass guide member 10 in such a manner as to sandwich the top end of the glass guide member 10 on the front and rear side thereof, respectively, so that length of the glass guide member 10 is extended upward by the guide extension member 20 and the core bracket 21.

Figure 5:
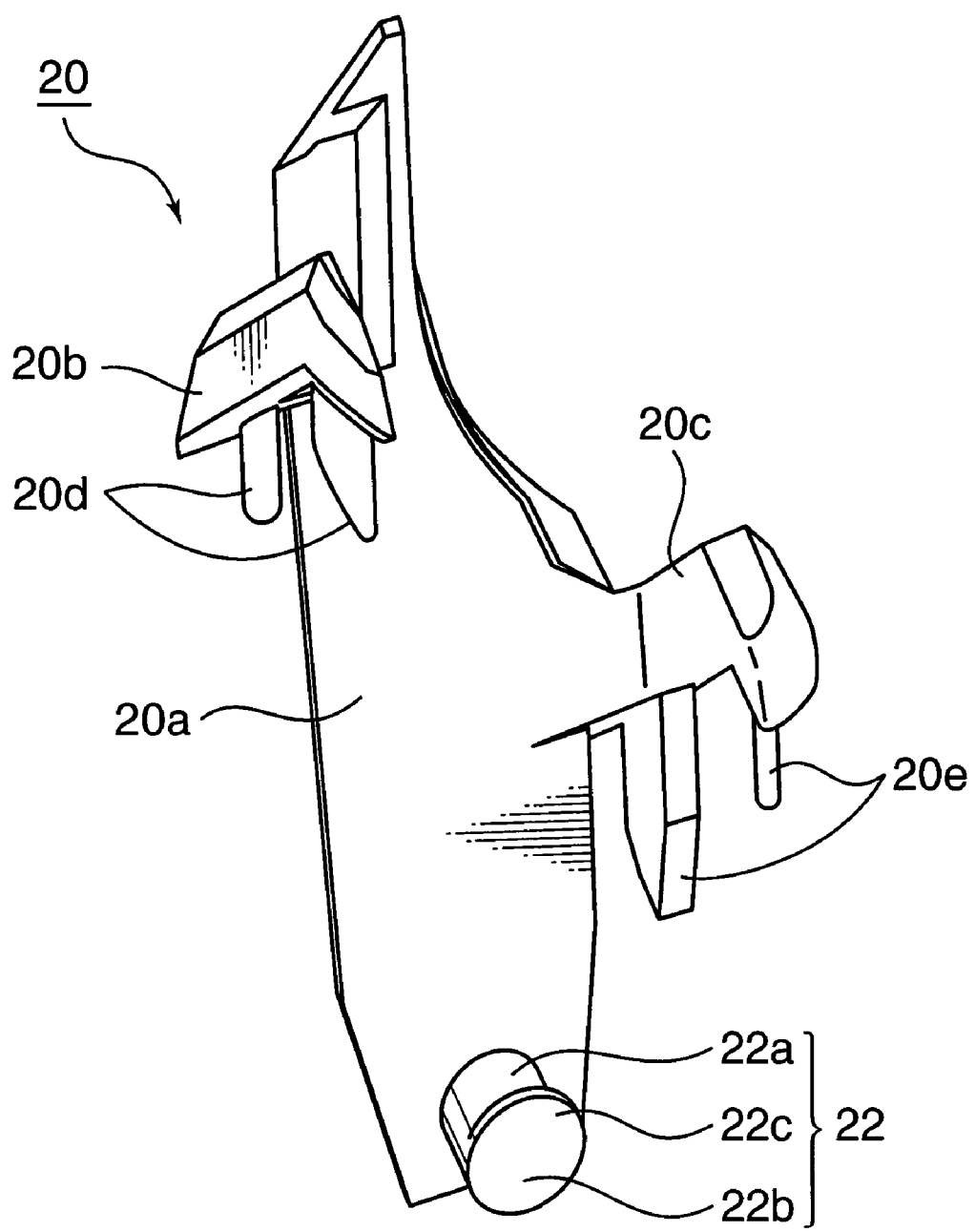
FIG. 5 is a perspective view of the guide extension member.

The guide extension member 20 is molded form a plastic material, and has a rectangular body plate 20a extending vertically, first and second side pieces 20b, 20c extending forward and backward from the right and left sides of the body plate 20a, and suspended pieces 20d, 20e extending downward from the rear ends of the first and second side pieces 20b, 20c, as shown in FIG. 5.

The first and second side pieces 20b, 20c have planar shape substantially the same as the top end faces of the pair of flanges 10a, 10b of the glass guide member 10, and are placed on the pair of flanges 10a, 10b. In other words, the upward extension of the glass guide member 10 is constituted by the first and second side pieces 20b, 20c of the guide extension member 20. With the first and second side pieces 20b, 20c (extensions) of the guide extension member 20 being mounted on the glass guide member 10 as described above, the suspended pieces 20d, 20e are inserted into gaps (refer to, for example, 10e in FIG. 3) formed in the cross sections of the pair of flanges 10a, 10b of the glass guide member 10.

The guide extension member 20 also has a protrusion 22 provided in a lower portion of the body plate 20a to protrude backward. The protrusion 22 has a round stem 22a and an expanded head 22b provided on the rear end of the round stem 22a, the expanded head 22b having an engagement claw 22c jutting out upward from the circumference of the stem 22a. The glass guide member 10 has a first opening 25 formed in a portion corresponding to the protrusion 22 of the guide extension member 20 as shown in FIG. 4, the first opening 25 being formed in a shape that allows the protrusion 22 having the expanded head to pass therethrough.

Figure 6:
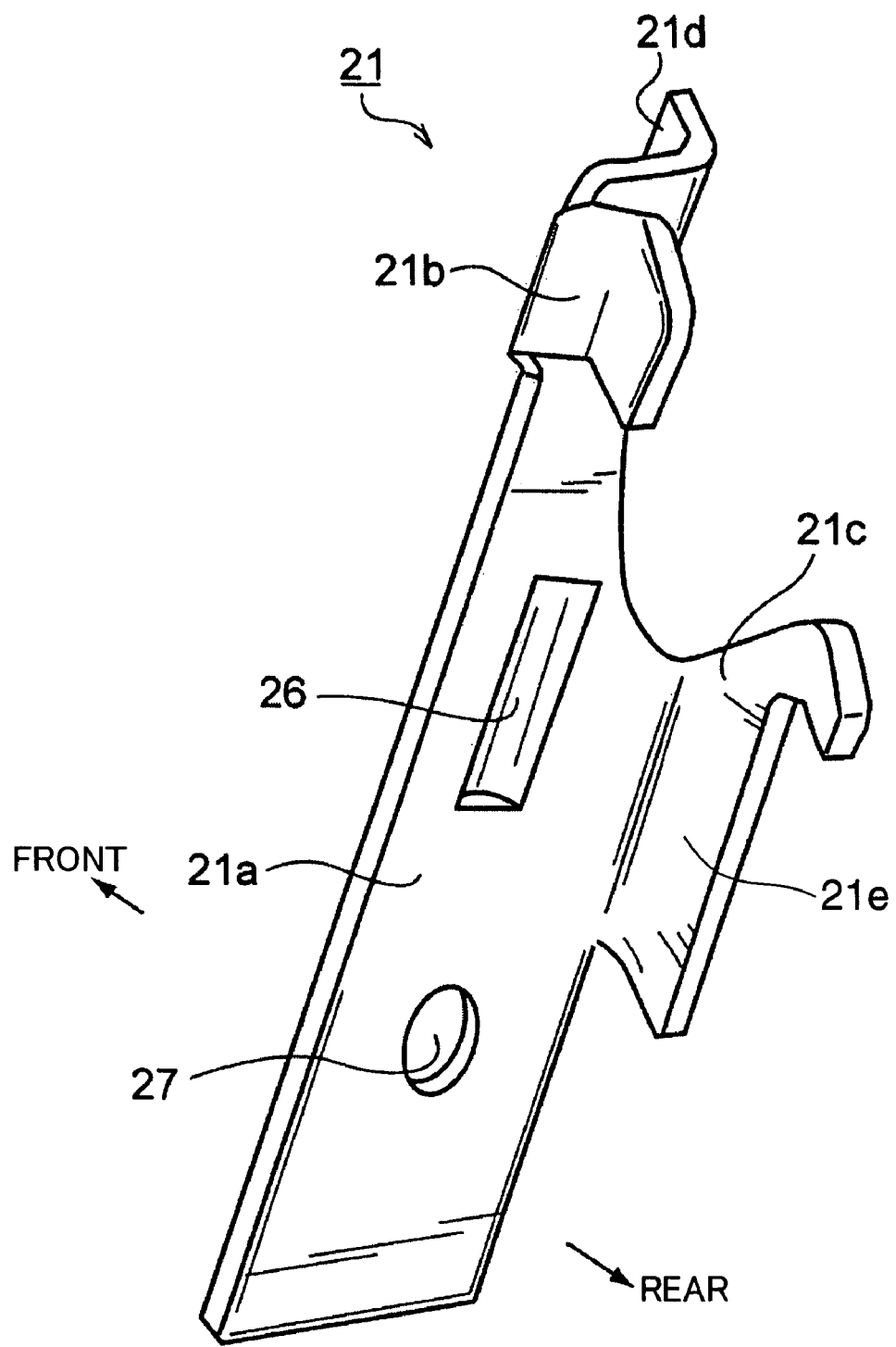
FIG. 6 is a perspective view of the core bracket.

The core bracket 21 is formed by pressing a metal, and has a body plate 21a extending vertically, first and second side pieces 21b, 21c extending from the top end of the right and left sides of the body plate 21a backward and a third side piece 21d extending to the front as shown in FIG. 6. The core bracket 21 preferably has a side wall 21e that extends downward from at least one (21c in the example shown) of the first and second side pieces 21b, 21c. Since the core bracket 21 has the body plate 21a and the first and second side pieces 21b, 21c, it has substantially the shape of letter C opening to the rear of the vehicle, in plan view.

The body plate 21a of the core bracket 21 has a bulging portion 26 formed to protrude to the front at a position a little above the center of the body plate in the vertical direction. While the bulging portion 26 is formed in a rectangular shape with a longer side directed in the vertical direction in the example shown, shape of the bulging portion is not limited to this and may be circle or oval.

The body plate 21a of the core bracket 21 also has a second opening 27 formed below the bulging portion 26, the second opening 27 being disposed at a position corresponding to the first opening 25 of the glass guide member 10. The second opening 27 of the core bracket 21 is formed in the shape of an elongated hole longer in the vertical direction than the first opening 25 of the glass guide member 10, as will be described in more detail later.

Figure 7:
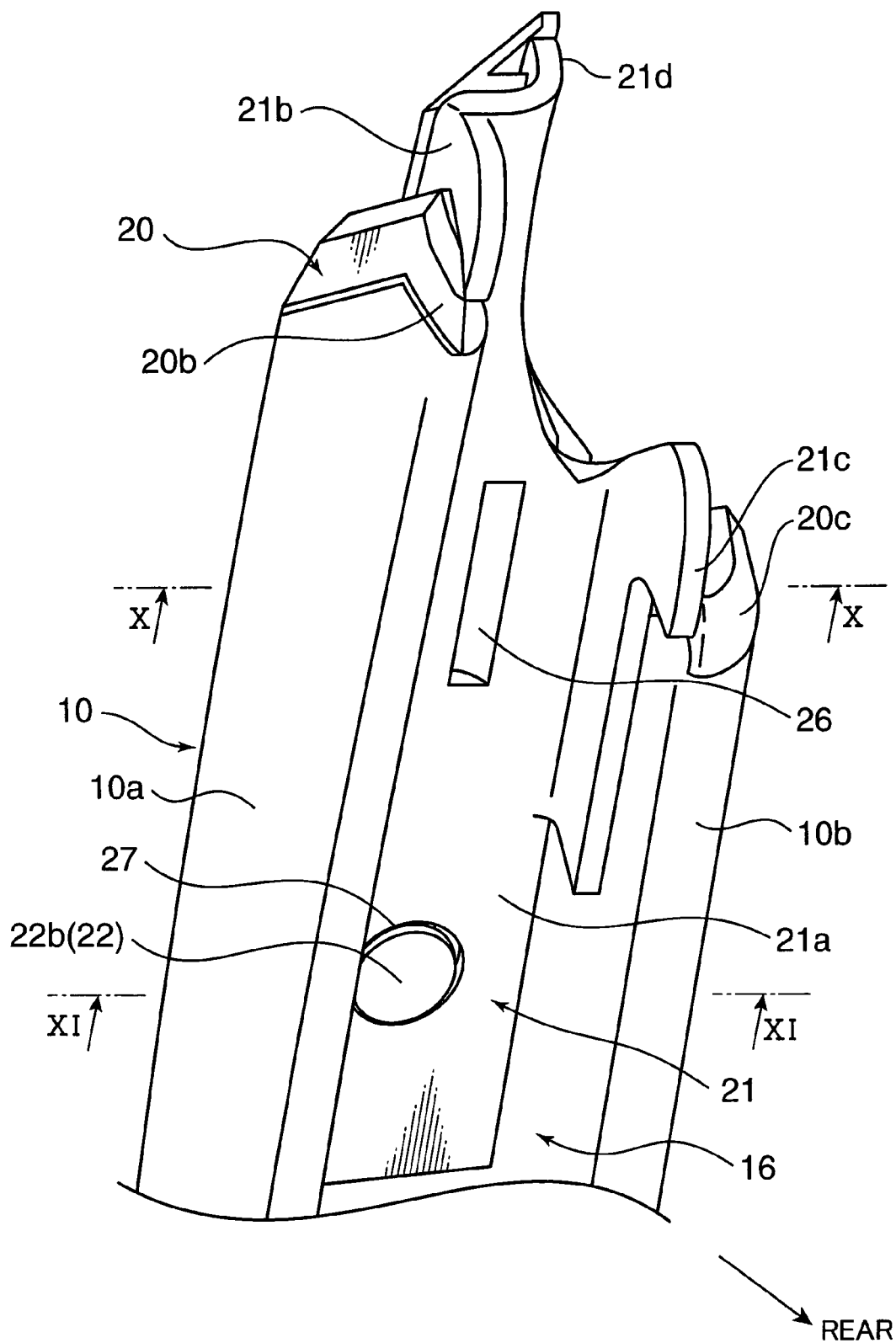
FIG. 7 is a perspective view showing the guide extension member and the core bracket being assembled on the glass guide member.
Figure 8:
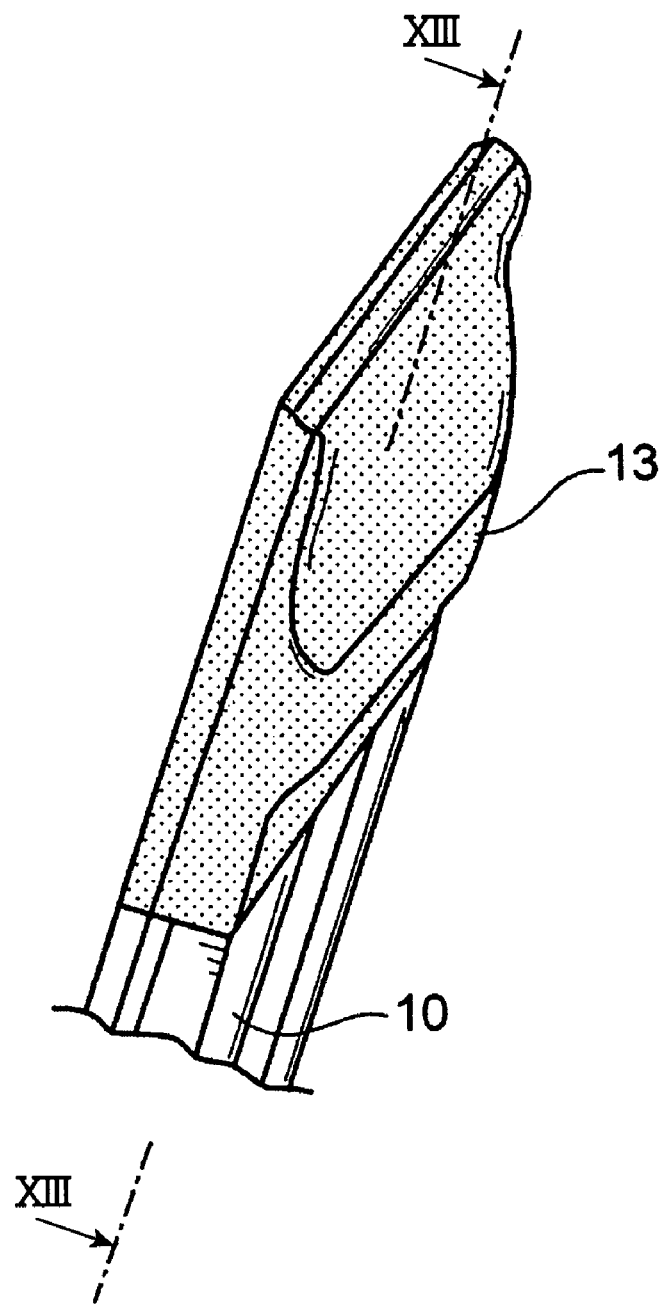
FIG. 8 is a perspective view showing a guide upper end seal member mounted on the guide extension member and on the core bracket which have been assembled on the glass guide member, viewed from the outside of the vehicle in the lateral direction.
Figure 9:
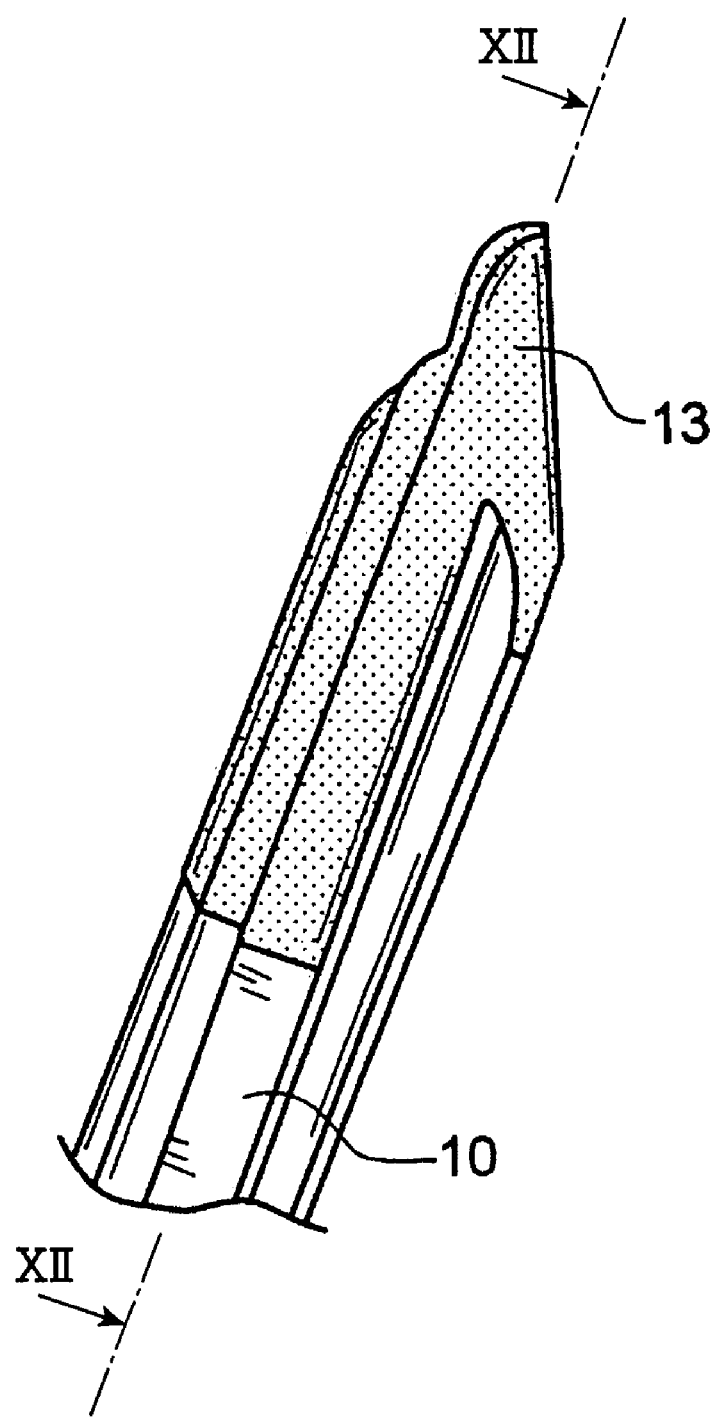
FIG. 9 is a perspective view showing the guide upper end seal member mounted on the guide extension member and on the core bracket which have been assembled on the glass guide member, viewed obliquely from above the rear of the vehicle.

FIG. 7 shows the guide extension member 20 and the core bracket 21 assembled on the top end of the glass guide member 10. The guide extension member 20 and the core bracket 21 are provided so as to sandwich the glass guide member 10 on the top end thereof, with the guide extension member 20 assembled in front of the glass guide member 10 and the core bracket 21 assembled behind the glass guide member 10. As a result, the glass guide member 10 is extended upward by the guide extension member 20 and the core bracket 21, and the top end surfaces of the flanges 10a, 10b of the glass guide member 10 are covered by the guide extension member 20 (the first and second side pieces 20b, 20c) which is molded from a plastic material. Moreover, as shown in FIG. 8 and FIG. 9, the guide upper end seal member 13 is mounted on the guide extension member 20 and the core bracket 21 so as to cover the external surfaces thereof. FIG. 8 shows the portion where the guide upper end seal member 13 is mounted, as viewed in lateral direction from the outside of the vehicle, and FIG. 9 shows the portion as viewed obliquely from above behind the rear of the vehicle.

Figure 13:
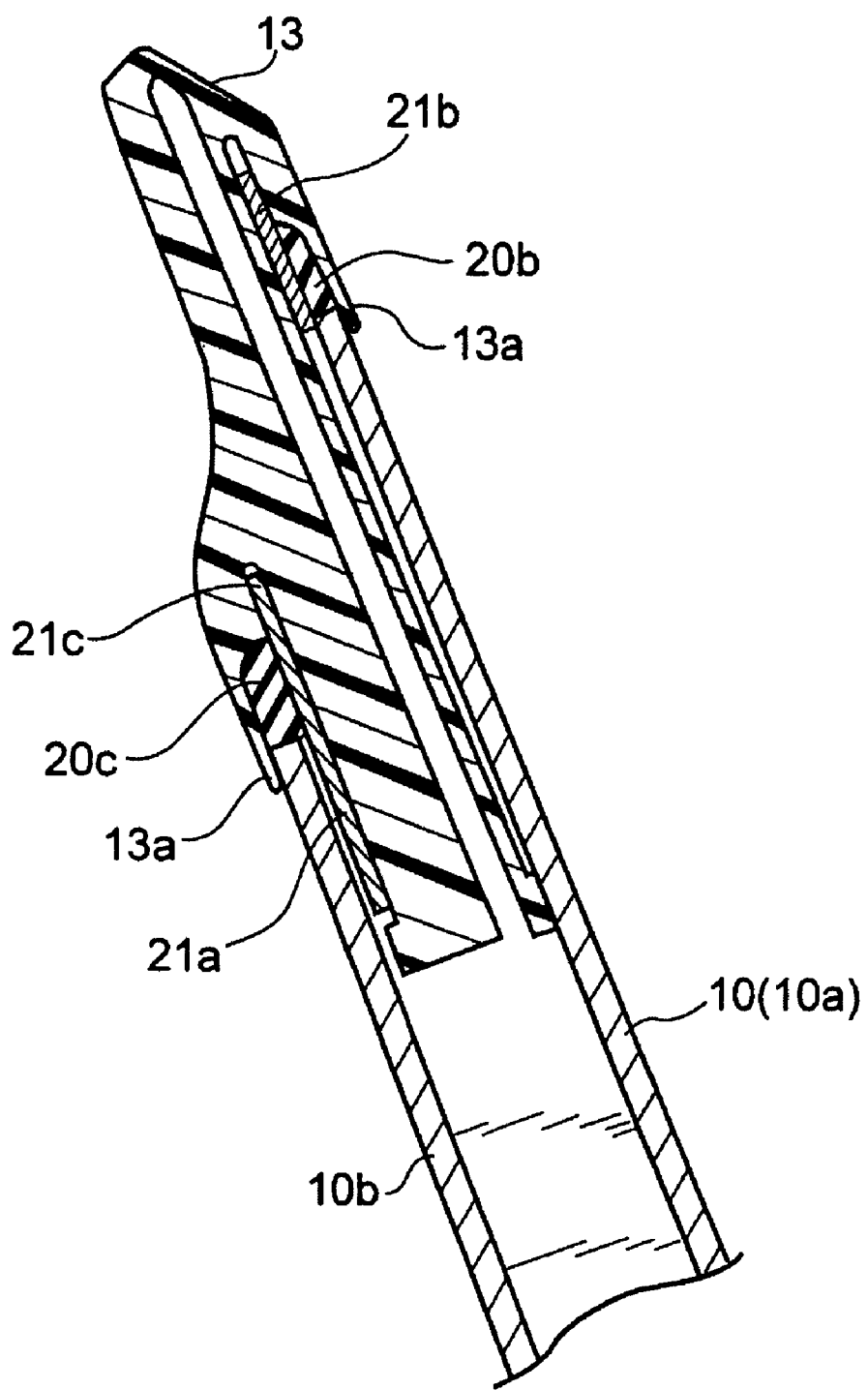
FIG. 13 is a cross sectional view taken along lines XIII-XIII of FIG. 8.
Figure 14:
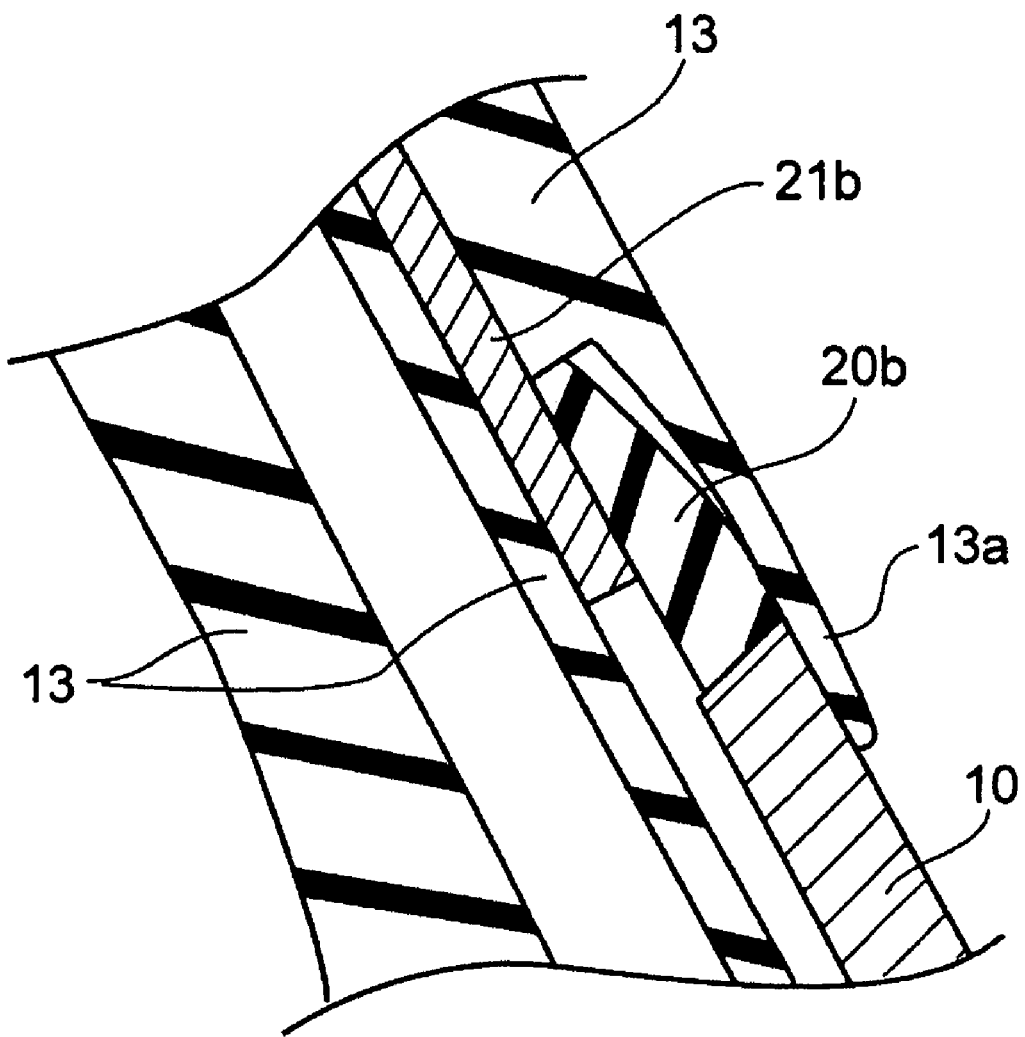
FIG. 14 is a partially enlarged view of a key portion of FIG. 13.

FIG. 13 is a longitudinal sectional view taken along lines XIII-XIII of FIG. 8, and FIG. 14 is a partially enlarged view of FIG. 13. As can be seen from FIG. 13 and FIG. 14, the first and second side pieces 20b, 20c of the guide extension member 20 are formed in such a shape that, when assembled onto the glass guide member 10, have surfaces substantially flush with the external surfaces of the flanges 10a, 10b of the glass guide member 10. Formed on the bottom end of the guide upper end seal member 13 is a bottom lip 13a that extends downward beyond the bottom end of the first and second side pieces 20b, 20c of the guide extension member 20, so that the top end of the guide upper end seal member 10 is covered by the bottom end lip 13a.

As will be seen from FIG. 13, recesses corresponding to the shapes of the guide extension member 20 and the core bracket 21 are formed inside of the guide upper end seal member 13, so that the guide extension member 20 and the core bracket 21 assembled on the glass guide member 10 are housed in the recesses.

Figure 10:
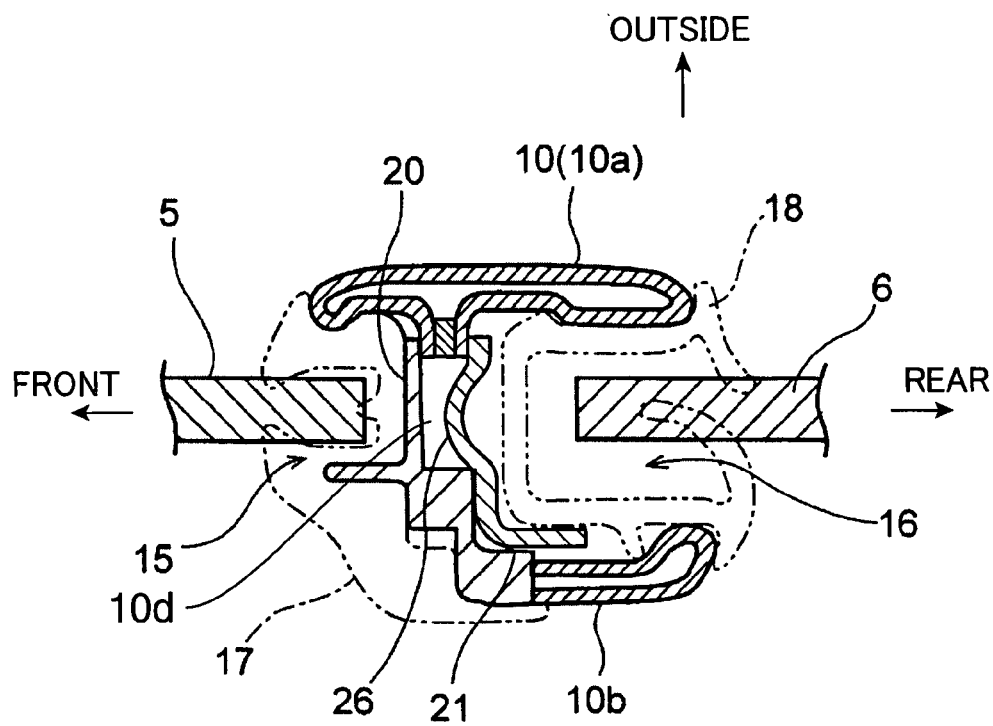
FIG. 10 is a cross sectional view taken along lines X-X of FIG. 7.

The procedure of assembling the door glass guiding structure 3 having the constitution described above will now be described. First, the core bracket 21 is inserted into the rear channel 16 of the glass guide member 10, so as to engage the bulging portion 26 of the core bracket 21 into the notch 10d formed on the top end of the web 10c of the glass guide member 10 (refer to, for example, FIG. 10 showing the sectional view of the engagement portion). This causes the core bracket 21 to be positioned at the top end of the glass guide member 10, so that the second opening 27 of the core bracket 21 and the first opening 25 of the glass guide member 10 overlap each other. After the core bracket 21 has been positioned on the glass guide member 10 as described above, the core bracket 21 is fastened to the glass guide member 10 by welding.

Then, the guide extension member 20 is mounted on the top end of the front channel 15 of the glass guide member 10. This mounting operation can be done by inserting the protrusion 22 into the first opening 25 of the glass guide member 10, while the first and second side pieces 20b, 20c of the guide extension member 20 have been mounted on the two flanges 10a, 10b of the glass guide member 10. The operation of inserting the protrusion 22 into the first opening 25 is preferably carried out by forcing the body plate 20a of the guide extension member 20 to undergo elastic deformation to have the protrusion 22 tilted. This makes it possible to insert the protrusion 22, which has the engagement claw 22c protruding upward, smoothly into the first opening 25.

Figure 11:
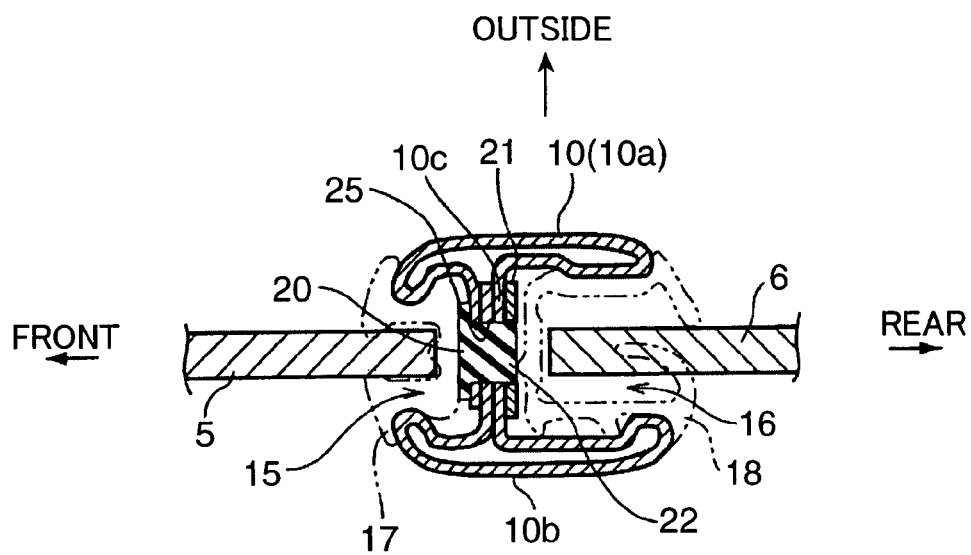
FIG. 11 is a cross sectional view taken along lines XI-XI of FIG. 7.
Figure 12:
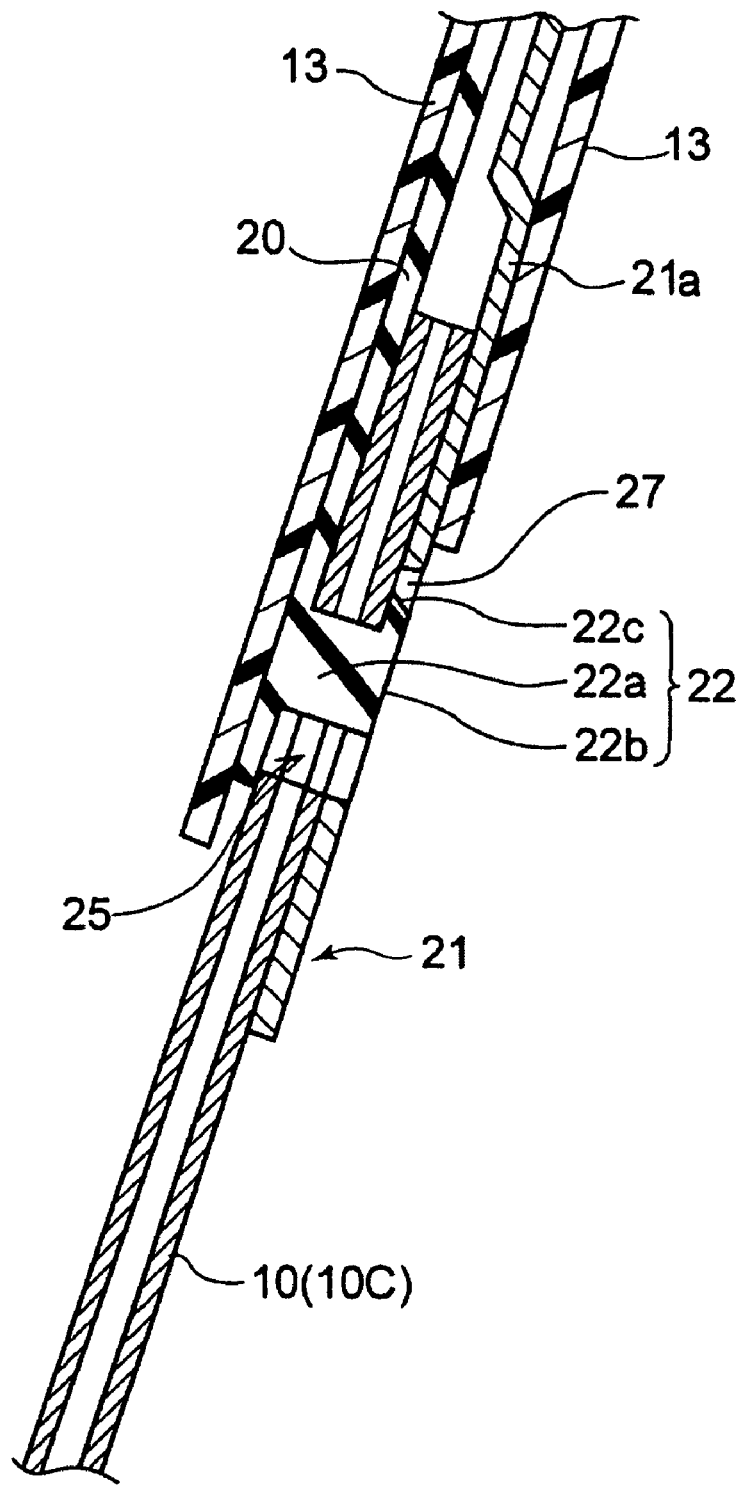
FIG. 12 is a longitudinal sectional view taken along lines XII-XII of FIG. 9.

FIG. 11 is a cross sectional view taken along lines XI-XI of FIG. 7, and FIG. 12 is a sectional view taken along lines XII-XII of FIG. 9. It will be seen from FIG. 11 and FIG. 12 that, when the protrusion 22 of the guide extension member 20 is inserted into the first opening 25 of the glass guide member 10 as described previously, the enlarged head 22b of the protrusion 22 advances toward the rear channel 16 of the glass guide member 10, while the engagement claw 22c of the enlarged head 22b engages with the web 10c on the back side thereof (upper periphery of the first opening 25). Positioning of the guide extension member 20 is made with respect to the glass guide member 10 by engaging the engagement claw 22c in this way.

As described previously, the second opening 27 of the core bracket 21 has the shape of an elongated hole longer in the vertical direction than the first opening 25 of the glass guide member 10. Accordingly, the enlarged head 22b which engages with the upper periphery of the first opening 25 can be accommodated in the second opening 27 without interfering with the core bracket 21 in the state of engagement. Therefore, it is preferable that the enlarged head 22b has a thickness equal to or slightly smaller than the thickness of the body plate 21a of the core bracket 21, which enables it to avoid such a situation that the enlarged head 22b accommodated in the second opening 27 protrudes rearward beyond the body plate 21a of the core bracket 21, and make the enlarged head 22b substantially flush with the body plate 21a.

When the guide upper end seal member 13 is put from above onto the guide extension member 20 and the core bracket 21 which are assembled on the top end of the glass guide member 10 in the procedure described above, the complete assembly shown in FIG. 8 and FIG. 9 is obtained.

As described above by making reference to FIG. 1 through FIG. 14, the guide extension member 20 and the core bracket 21 which are members different from the glass guide member 10 are mounted on the top end of the glass guide member 10, and the guide upper end seal member 13 is attached to the guide extension member 20 and the core bracket 21 for sealing the top ends of the front ventilator glass 5 and the movable door glass 6. As a result, even when the glass guide member 10 is made by rolling a sheet in a relatively simple configuration, the guide upper end seal member 13 can be firmly supported on these members 20, 21 and sealing function of the guide upper end seal member 13 can be effectively prevented from being invalidated by the load exerted by other members of the vehicle body such as the front pillar 4 and other causes, by forming the guide extension member 20 and the core bracket 21, which are separate members from the glass guide member 10, in optimum configurations for the mounting of the guide upper end seal member 13. Moreover, since the core bracket 21 is formed by pressing of a metal sheet in the embodiment described above, top end of the glass guide member 10 can be effectively reinforced, thereby further improving the rigidity of support of the guide upper end seal member 13. Thus, as the guide extension member 20 and the core bracket 21, which are separate members from the glass guide member 10 and can therefore be designed with high degree of freedom, are provided on the top end of the glass guide member 10, it is made possible to make the door glass guiding structure 3 comprising the glass guide member 10 manufactured from a relatively low-priced material such as rolled sheet, while satisfactorily maintaining the required functions.

Also, because the guide upper end seal member 13 is attached to the guide extension member 20 and the core bracket 21, which are provided to extend the glass guide member 10 upward, a worker who assembles the guide upper end seal member 13 can be effectively prevented from being injured on hand by touching the top end (typically formed by cutting) of the glass guide member 10 made from rolled sheet. Also, the guide upper end seal member 13 can be mounted by simply placing it onto the guide extension member 20 and the core bracket 21 from above, and therefore the assembly operation is made easier.

Moreover, since the first and second side pieces 20b, 20c which are mounted on the top end face of the glass guide member 10 and the protrusion 22 which is inserted into the first opening 25 of the glass guide member 10 are provided on the guide extension member 20, the operation of assembling the guide extension member 20 onto the glass guide member 10 can be done in the procedure of placing the first and second side pieces 20b, 20c on the top end face (top end faces of the flanges 10a, 10b) of the glass guide member 10 and then inserting the protrusion 22 into the first opening 25 of the glass guide member 10, and therefore ease of assembling the guide extension member 20 can be effectively improved.

In addition, since the enlarged head 22b is provided on the protrusion 22 of the guide extension member 20 and the enlarged head 22b is engaged with the periphery of the first opening 25, the guide extension member 20 fastened onto the glass guide member 10 can be surely prevented from coming off. Also, there is such an advantage that, because the guide extension member 20 is made of molded plastic of which configuration can be designed relatively freely, the guide extension member 20 that constitutes the frame of the upper portion of the door glass guiding structure 3 can be designed in an optimum configuration regardless of the shape of the top ends of the flanges 10a, 10b of the glass guide member 10.

Also, in the embodiment described above, since the guide extension member 20 and the core bracket 21 which are attached to the top end of the glass guide member 10 are individually disposed in the front and rear channels 15, 16 formed on the front and back sides of the web 10c of the glass guide member 10, respectively, both the front ventilator glass 5 and the movable door glass 6 of which side edges are inserted into the front and rear channels 15, 16 can be supported with well-balanced rigidity. Specifically, in case both the guide extension member 20 and the core bracket 21 are disposed together in either the front channel 15 or the rear channel 16 of the glass guide member 10, depth of the channel 15 or 16 is significantly reduced by the members 20, 21, thus making it difficult to provide a sufficient area of supporting the front ventilator glass 5 or the movable door glass 6 inserted in the channel 15 or 16. In case the guide extension member 20 and the core bracket 21 are separately disposed in the front and rear channels 15, 16, respectively, as in the embodiment described above, in contrast, sufficient area required to support the front ventilator glass 5 and the movable door glass 6 can be ensured, so that the front ventilator glass 5 and the movable door glass 6 can be supported with well-balanced rigidity.

Also, because the core bracket 21 having high rigidity formed by pressing of a metal sheet is disposed in the rear channel 16 in which the front edge of the movable door glass 6 having a relatively large area is inserted, and the core bracket 21 is formed in substantially the shape of letter C in plan view which can accommodate the movable door glass 6, rigidity of support for the movable door glass 6 can be further effectively improved.

The present invention has been described by way of preferred embodiment. It is understood, however, that the present invention is not limited to the first embodiment shown in FIG. 1 through FIG. 14, and various modifications can be made without departing from the scope and spirit of the of the present invention. For example, such modifications as described below can be conceived.

Figure 15:
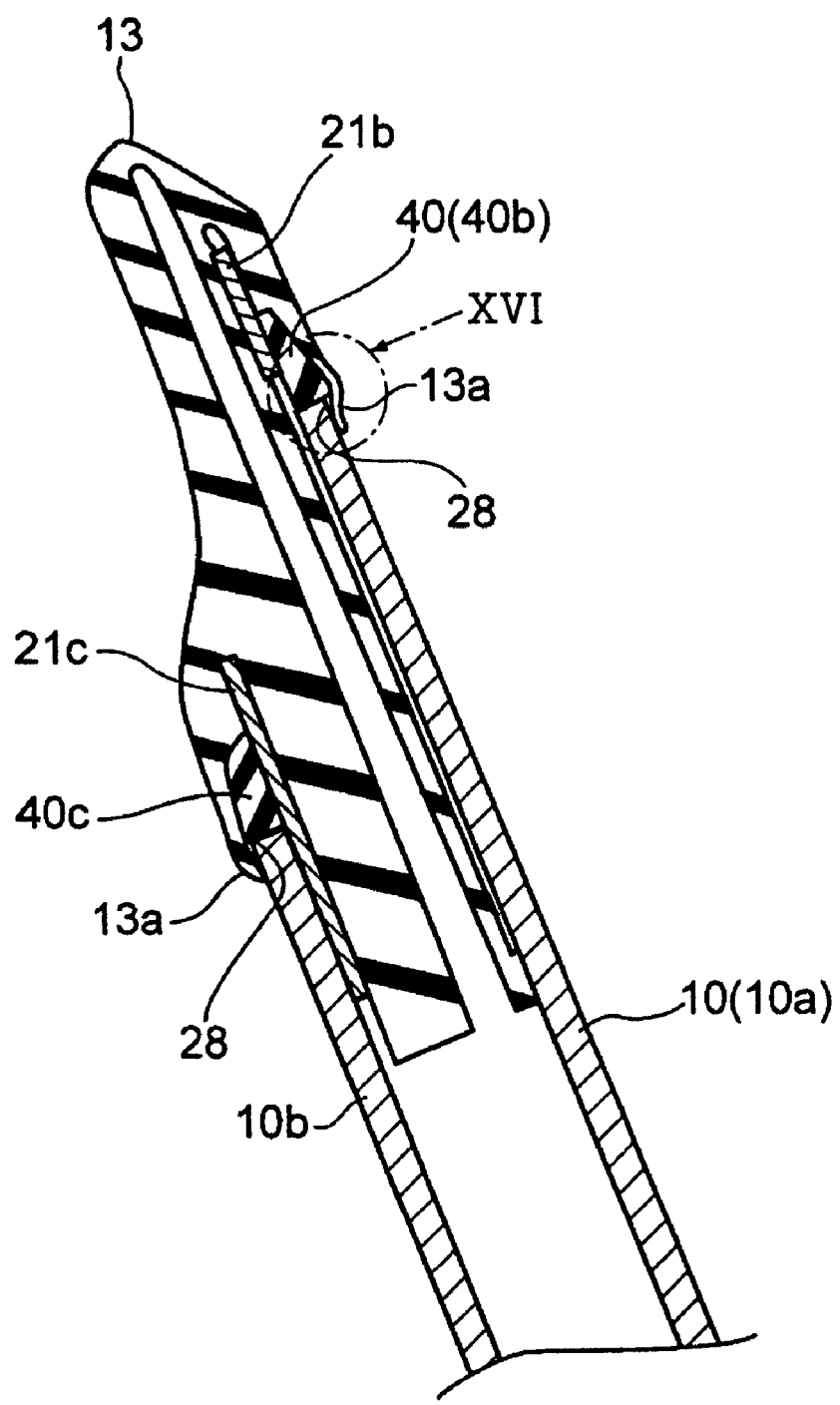
FIG. 15 is a sectional view corresponding to FIG. 13, explanatory of a second embodiment of the present invention.
Figure 16:
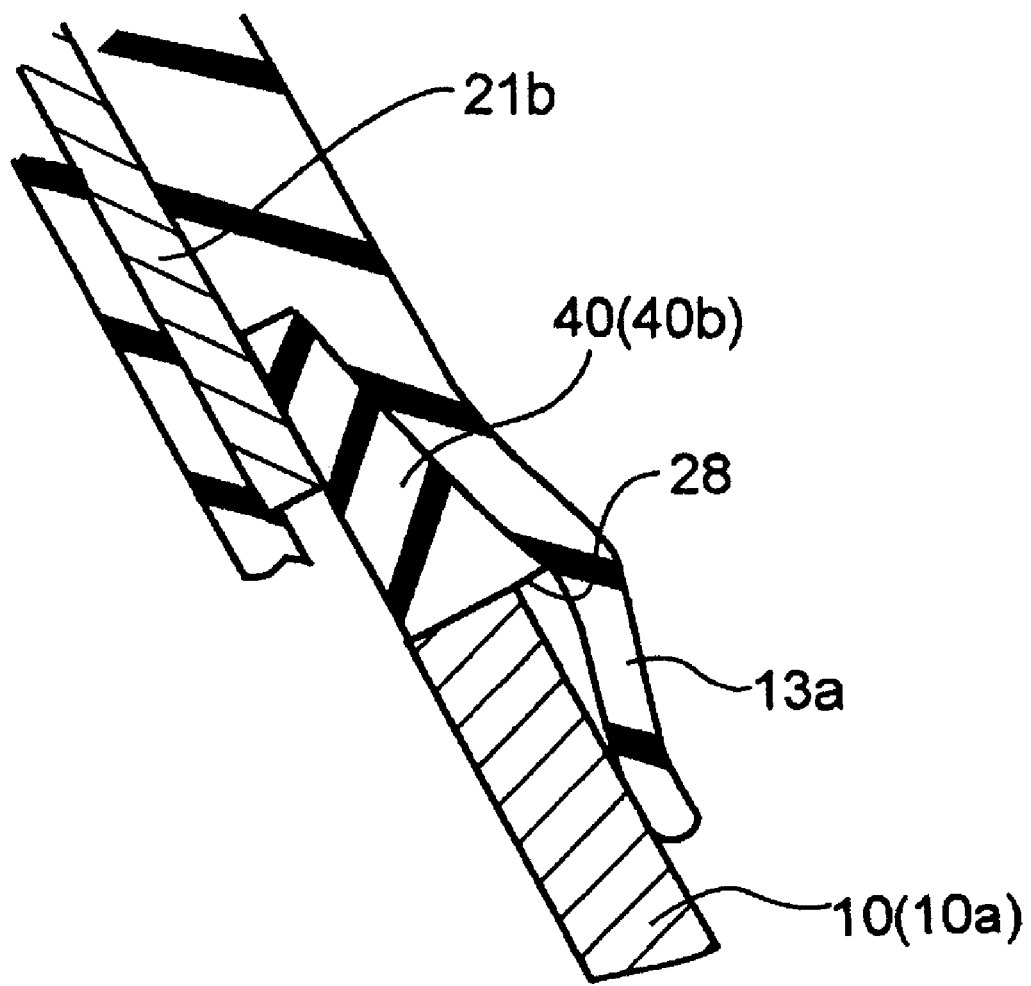
FIG. 16 is a partially enlarged view of a portion indicated by arrow XVI in FIG. 15.

FIG. 15 and FIG. 16 show the second embodiment of the present invention. FIG. 16 is an enlarged view of the portion indicated by arrow XVI in FIG. 15. A guide extension member 40 of the second embodiment has first and second side pieces 40b, 40c which correspond to the first and second side pieces 20b, 20c of the guide extension member 20 of the first embodiment, the first and second side pieces 40b, 40c having thicknesses a little larger than the thicknesses of the flanges 10a, 10b of the glass guide member 10. In this constitution, the first and second side pieces 40b, 40c of the guide extension member 40 protrude outwardly beyond the flanges 10a, 10b of the glass guide member 10 so as to form a step 28 between the guide extension member 40 and the glass guide member 10. The guide upper end seal member 13 is disposed so that the bottom lip 13a that constitutes the bottom portion thereof extends downward beyond the step 28, so as to prevent the guide upper end seal member 13 from coming off by frictional engagement of the step 28 and the bottom lip 13a. Also, because the portion where the step 28 is formed can be concealed with a smooth surface by covering the step 28 with the bottom lip 13a of the guide upper end seal member 13, such advantages are provided as the aerodynamic characteristic of the vehicle body and the external appearance can be prevented from deteriorating.

Figure 17:
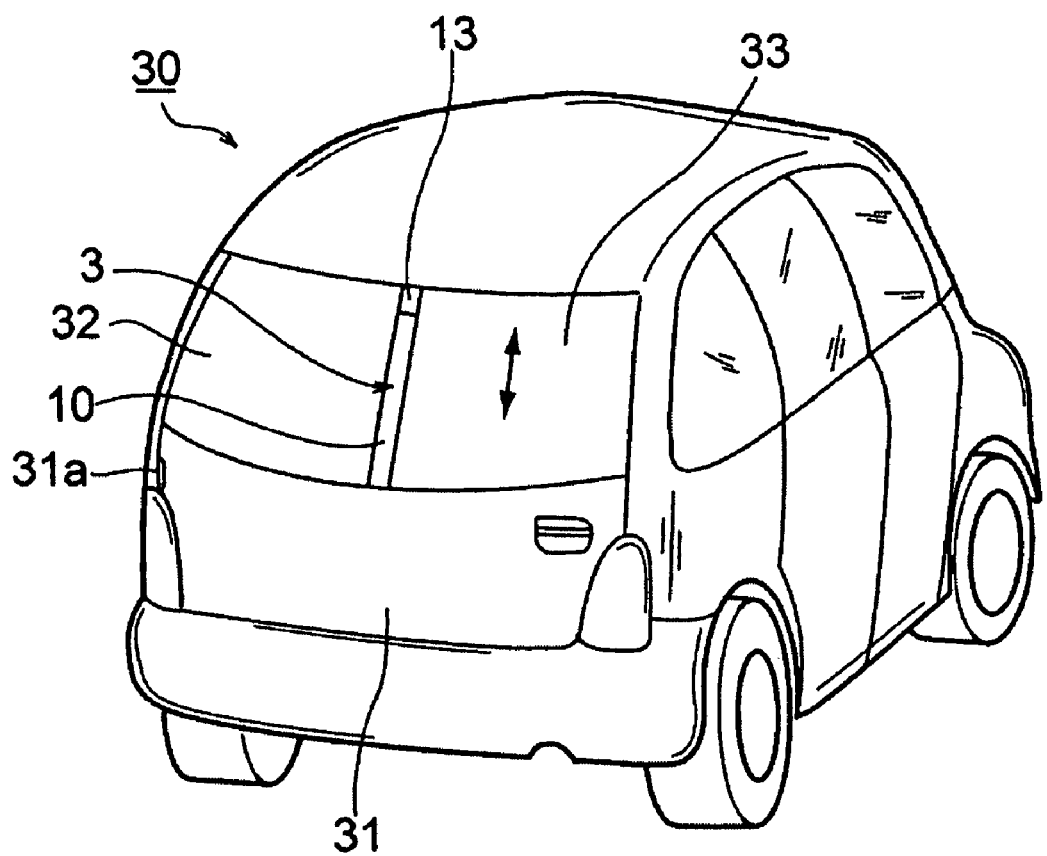
FIG. 17 shows a third embodiment of the present invention where the door glass guiding structure of the present invention is applied to a vehicle having a back door.

The door glass guiding structure 3 of the present invention is applied to the 2-seater open car shown in FIG. 1 in the first and second embodiments. However, the door glass guiding structure 3 of the present invention may also be applied to a vehicle having a back door 31 which opens around a substantially vertical hinge 31a, the back door 31 having first and second sashless door glasses 32, 33 that adjoin each other, such as the vehicle 30 shown in FIG. 17. In this case, the door glass guiding structure 3 may be installed between the first and second door glasses 32, 33, for example, with the first door glass 32 being fixed and the second door glass 33 being movable (can be moved up and down).

As described above by way of the embodiments, the present invention is characterized by the constitution provided with the glass guide member 10 that is disposed between two door glasses (for example, the front ventilator glass 5 and the movable door glass 6) supported side by side on a door (for example, the side door 2) of a vehicle so as to guide the vertical movement of at least one of the door glasses, the core bracket 21 which is constituted of a member different from the glass guide member 10 and is mounted on top end of the glass guide member 10 so as to extend the length thereof upward, and the guide upper end seal member 13 attached to cover the external surface of the core bracket 21 so as to provide water-tight sealing on the top ends of the two door glasses.

According to the present invention, since the core bracket 21 constituted from a member different from the glass guide member 10 is mounted on top end of the glass guide member 10 and the guide upper end seal member 13 is attached on the core bracket 21 so as to seal the top end of the door glass, the guide upper end seal member 13 can be firmly supported on the core bracket 21 by forming the guide extension member 20 and the core bracket 21, which are separate members from the glass guide member 10, in optimum configurations for the mounting of the guide upper end seal member 13. even when the glass guide member 10 is made by rolling a sheet in a relatively simple configuration, and the guide upper end seal member 13 can be firmly supported on the core bracket 21 so that the sealing function of the guide upper end seal member 13 can be effectively prevented from being invalidated by the load exerted by other members of the vehicle body such as the front pillar 4 and other causes. Moreover, top end of the glass guide member 10 can be effectively reinforced by using a material having high rigidity for the core bracket 21, thereby further improving the rigidity of support of the guide upper end seal member 13. Thus, as the guide extension member 20 and the core bracket 21, which are separate members from the glass guide member 10 and can therefore be designed with a high degree of freedom, are provided on the top end of the glass guide member 10, it is made possible to make the door glass guiding structure 3 comprising the glass guide member 10 that can be manufactured from a relatively low-priced material such as rolled sheet, while satisfactorily maintaining the required functions.

It is preferable that the guide extension member 20 which is a member separate from the glass guide member 10 and the core bracket 21 is provided on the top end of the glass guide member 10, and the extensions (the first and second side pieces 20b, 20c) that are provided on the top end face of the glass guide member 10 and extend the glass guide member 10 upward are formed in the guide extension member 20, and the guide upper end seal member 13 is attached so as to cover the external surfaces of the extensions (20b, 20c).

In the constitution described above, since the extensions (20b, 20c) are provided on the top end face of the glass guide member 10, and the guide upper end seal member 13 is attached so as to cover the extensions (20b, 20c), in case the top end of the glass guide member 10 has a cut surface formed by making the glass guide member 10 from rolled sheet, a worker who assembles the guide upper end seal member 13 can be effectively prevented from being injured on hand by touching the cut surface. Moreover, there is also such an advantage that, since the guide extension member 20 as well as the core bracket 21 is mounted on the top end of the glass guide member 10, the top end of the glass guide member 10 can be more effectively reinforced.

In this case, as the means for positioning and preventing coming off of the guide extension member 20 effectively, it is preferable to form an opening (the first opening 25) in the upper end portion of the glass guide member 10 and provide the protrusion 22 that fits in this opening (25) on the guide extension member 20.

In case the glass guide member 10 has H-shaped cross section with two channels 15, 16 formed therein opening toward opposite directions and the side edges of the two door glasses are supported in the two channels 15, 16, it is preferable that the core bracket 21 and the guide extension member 20 are disposed separately in the two channels 15, 16 of the glass guide member 10.

The constitution described above makes it possible to ensure well-balanced rigidity of supporting the two door glasses, unlike in the case of disposing both the guide extension member 20 and the core bracket 21 together in one of the channels 15 and 16 of the glass guide member 10. In case both the core bracket 21 and the guide extension member 20 are disposed together in one of the channels 15 and 16 of the glass guide member 10, depth of the channel (15 or 16) is significantly reduced by the members 20, 21, thus making it difficult to provide a sufficient area of supporting the door glass in the channel (15 or 16). In case the core bracket 21 and the guide extension member 20 are separately disposed in the channels 15, 16, respectively, in contrast, sufficient area of supporting the two door glasses can be ensured, so that the door glasses can be supported with well-balanced rigidity.

With this constitution, in case one of the two door glasses (the movable door glass 6 in the first embodiment) has a larger area than the other door glass (the front ventilator glass 5 in the first embodiment) and the core bracket 21 is disposed in the channel 16 on one door glass side, it is preferable to form the core bracket 21 in substantially the shape of letter C in plan view which can accommodate the side edge of one of the door glasses.

Thus it is made possible to dispose the core bracket 21 in the channel 16 without causing significant influence on the area of supporting the door glass having the larger area, while at the same time the rigidity of support for the particular door glass can be more effectively increased since the top end of the door glass (channel 16 side) in the glass guide member 10 can be reinforced by means of the core bracket 21.

In this case, in order to further increase the rigidity of support of the particular door glass having the larger area, it is preferable to make the channel 16 in which the particular door glass is inserted, among the two channels 15, 16 of the glass guide member 10, deeper than the other channel 15.

The extensions (20b, 20c) of the guide extension member 20 may be formed in such shapes that have surfaces substantially flush with the external surfaces of the flanges 10a, 10b of the glass guide member 10. In contrast, the extensions (20b, 20c) of the guide extension member 20 may be formed to protrude outwardly beyond the flanges 10a, 10b of the glass guide member 10 so as to form the step 28 between the guide extension member 20 and the glass guide member 10. Then, the guide upper end seal member 13 can be suppressed from coming off toward the above by means of the step 28 when the bottom end of the guide upper end seal member 13 that is attached to cover the external surface of the extensions (20b, 20c) extends downward beyond the step 28.

The invention claimed is:

1. A door glass guiding structure for vehicle, comprising:
a glass guide member which is disposed between two door glasses supported side by side on a door of the vehicle so as to guide the vertical movement of at least one of the door glasses, said glass guide member has an H-shaped cross section, having a pair of flanges and a web that connects the flanges,
a core bracket which is constituted of a member different from the glass guide member and is mounted on top end of the glass guide member so as to extend the length thereof upward,
a guide upper end seal member attached to cover the external surface of the core bracket so as to provide watertight sealing on the top ends of the two door glasses, and
a guide extension member, which is a member different from the glass guide member and the core bracket, is provided on top end of the glass guide member,
the guide extension member has an extension which is mounted on the top end face of the glass guide member so as to extend the length of the glass guide member upward, while the guide upper end seal member is attached so as to cover the external surface of the extension,
wherein said guide extension member has a vertically extending body plate, and a first and a second side pieces that are extending forward and backward from one side and the other side of said body plate, and wherein said first and said second side pieces are mounted on the top ends of said pair of flanges, respectively.

2. The door glass guiding structure for vehicle according to claim 1, wherein the glass guide member has an opening formed in the upper portion thereof and a protrusion that fits in the opening is provided on the guide extension member.

3. The door glass guiding structure for vehicle according to claim 2, wherein the glass guide member has H-shaped cross section with two channels formed therein opening in opposite directions with side edges of the two door glasses being inserted and supported in the two channels, and the core bracket and the guide extension member are disposed separately in the two channels of the glass guide member.

4. The door glass guiding structure for vehicle according to claim 3, wherein one of the two door glasses has a larger area than the other door glass, the core bracket is disposed in the channel on the side of the one door glass among the two channels of the glass guide member, and has substantially the shape of letter C in plan view which can accommodate the side edge of one of the door glasses which is inserted into the channel.

5. The door glass guiding structure for vehicle according to claim 4, wherein the channel in which the door glass having larger area is inserted, among the two channels of the glass guide member, is deeper than the other channel.

6. The door glass guiding structure for vehicle according to claim 1, wherein the glass guide member is made by rolling a sheet.

7. The door glass guiding structure for vehicle according to claim 1, wherein the extension of the guide extension member is formed in such a shape that protrudes outwardly beyond the flanges of the glass guide member, and the bottom end of the guide upper end seal member extends downward beyond a step formed between the guide extension member and the glass guide member.

8. The door glass guiding structure for vehicle according to claim 2, wherein the glass guide member is made by rolling a sheet.

9. The door glass guiding structure for vehicle according to claim 3, wherein the glass guide member is made by rolling a sheet.

10. The door glass guiding structure for vehicle according to claim 4, wherein the glass guide member is made by rolling a sheet.

11. The door glass guiding structure for vehicle according to claim 5, wherein the glass guide member is made by rolling a sheet.

12. The door glass guiding structure for vehicle according to claim 2, wherein the extension of the guide extension member is formed in such a shape that protrudes outwardly beyond the flanges of the glass guide member, and the bottom end of the guide upper end seal member extends downward beyond a step formed between the guide extension member and the glass guide member.

13. The door glass guiding structure for vehicle according to claim 3, wherein the extension of the guide extension member is formed in such a shape that protrudes outwardly beyond the flanges of the glass guide member, and the bottom end of the guide upper end seal member extends downward beyond a step formed between the guide extension member and the glass guide member.

14. The door glass guiding structure for vehicle according to claim 4, wherein the extension of the guide extension member is formed in such a shape that protrudes outwardly beyond the flanges of the glass guide member, and the bottom end of the guide upper end seal member extends downward beyond a step formed between the guide extension member and the glass guide member.

15. The door glass guiding structure for vehicle according to claim 5, wherein the extension of the guide extension member is formed in such a shape that protrudes outwardly beyond the flanges of the glass guide member, and the bottom end of the guide upper end seal member extends downward beyond a step formed between the guide extension member and the glass guide member.

* * * * *